United States Patent
Hafner et al.

(10) Patent No.: US 10,907,484 B2
(45) Date of Patent: Feb. 2, 2021

(54) METHOD FOR REPLACING METAL AIRFOIL WITH CERAMIC AIRFOIL, AND RELATED TURBOMACHINE BLADE

(71) Applicant: General Electric Company, Schenectady, NY (US)

(72) Inventors: Matthew Troy Hafner, Honea Path, SC (US); John McConnell Delvaux, Fountain Inn, SC (US); Thomas Raymond Farrell, Simpsonville, SC (US); Markus Feigl, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 84 days.

(21) Appl. No.: 16/270,071

(22) Filed: Feb. 7, 2019

(65) Prior Publication Data

US 2020/0256204 A1   Aug. 13, 2020

(51) Int. Cl.
*F01D 5/30* (2006.01)
*F01D 5/00* (2006.01)

(52) U.S. Cl.
CPC .......... *F01D 5/3053* (2013.01); *F01D 5/005* (2013.01); *F01D 5/303* (2013.01); *F01D 5/3084* (2013.01); *F05D 2220/32* (2013.01); *F05D 2230/60* (2013.01); *F05D 2240/30* (2013.01)

(58) Field of Classification Search
CPC ...... F01D 5/3053; F01D 5/303; F01D 5/3084; F01D 5/005
See application file for complete search history.

(56) References Cited

U.S. PATENT DOCUMENTS

| | | | |
|---|---|---|---|
| 8,231,354 B2 | 7/2012 | Campbell et al. | |
| 8,496,443 B2 | 7/2013 | Campbell et al. | |
| 8,721,290 B2 | 5/2014 | Darkins, Jr. et al. | |
| 8,727,730 B2* | 5/2014 | Liotta | F01D 5/147 416/193 A |
| 9,328,612 B2* | 5/2016 | Kubel | F01D 5/005 |
| 2012/0051924 A1 | 3/2012 | Garcia-Crespo et al. | |
| 2014/0112794 A1 | 4/2014 | Garcia-Crespo et al. | |
| 2016/0201483 A1* | 7/2016 | Engel | F01D 5/3007 416/220 R |
| 2016/0376920 A1* | 12/2016 | Luczak | F01D 5/3084 416/1 |
| 2020/0080431 A1* | 3/2020 | Dhiwar | F01D 5/303 |

* cited by examiner

*Primary Examiner* — Courtney D Heinle
*Assistant Examiner* — Michael K. Reitz
(74) *Attorney, Agent, or Firm* — Charlotte Wilson; Hoffman Warnick LLC (57) ABSTRACT

A method may include: in a used metal turbomachine blade including a root including a shank, a platform coupled to the shank and an airfoil coupled to the platform, removing the airfoil, leaving a remaining base including the platform, the shank and the root. The method may also form a radially extending opening through the platform into the shank, and insert a ceramic shank nub extending from a ceramic airfoil into the radially extending opening of the remaining base. The ceramic airfoil is fixedly attached to the remaining base. The method allows reuse of the metal shank while providing the lower cooling requirements of a ceramic airfoil.

10 Claims, 7 Drawing Sheets

METHOD FOR REPLACING METAL AIRFOIL WITH CERAMIC AIRFOIL, AND RELATED TURBOMACHINE BLADE

BACKGROUND OF THE INVENTION

The disclosure relates generally to turbomachine blades, and more particularly, to a method of replacing a metal airfoil of a turbomachine blade with a ceramic airfoil, and a related turbomachine blade.

Turbomachines employ a number of rotating blades in the path of a working fluid. Turbomachine rotating blades require replacement or repair after a certain amount of use. One approach of repairing turbomachine blades is to replace the entire blade with a ceramic matrix composite (CMC) blade. CMC is an attractive material replacement because it is lighter than conventional metal blades. However, all-CMC blades are expensive to manufacture, especially where the component has a complex shape like that of a shank and/or a dovetail connector at the root of the turbomachine blade. In addition, the shank tends to be relatively long to distance the hot gas path from the rotor wheel, which further increases costs. To address this situation, metal adapters that include a rotor wheel connector (e.g., a dovetail) have been employed that engage with a CMC shank and CMC airfoil. However, in most cases, because the shank is exposed to lower temperatures than the airfoil, the shank typically has more useful life remaining than the airfoil, and may not require replacement.

BRIEF DESCRIPTION OF THE INVENTION

A first aspect of the disclosure provides a method, comprising: in a used metal turbomachine blade including a root including a shank, a platform coupled to the shank and an airfoil coupled to the platform, removing the airfoil, leaving a remaining base including the platform, the shank and the root; forming a radially extending opening through the platform into the shank; inserting a ceramic shank nub extending from a ceramic airfoil into the radially extending opening of the remaining base; and fixedly attaching the ceramic airfoil to the remaining base.

A second aspect of the disclosure provides a turbomachine blade, comprising: a root including a shank; a platform coupled to the shank; a radially extending opening through the platform into the shank; a ceramic airfoil including a ceramic airfoil body and a ceramic shank nub extending from the ceramic airfoil body into the radially extending opening of the shank; and a connector extending through a connector opening in at least one face of the shank to fixedly attach the ceramic airfoil to the shank.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

Where an element or layer is referred to as being "on," "engaged to," "disengaged from," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As noted, embodiments of the disclosure provide a method for repairing a turbomachine blade. Embodiments of the disclosure are applied to a used metal turbomachine blade including a root including a shank, a platform coupled to the shank and an airfoil coupled to the platform. The metal airfoil is removed, leaving a remaining base including the platform and the shank. A radially extending opening is formed through the platform into the shank. A ceramic airfoil is connected to the shank by inserting a ceramic shank nub extending from a ceramic airfoil body into the radially extending opening of the remaining base in the shank, and the ceramic airfoil is fixedly attached to the remaining base. Embodiments of the disclosure thus allow re-use of the shank while providing the advantages of a ceramic airfoil.

Figure 1:
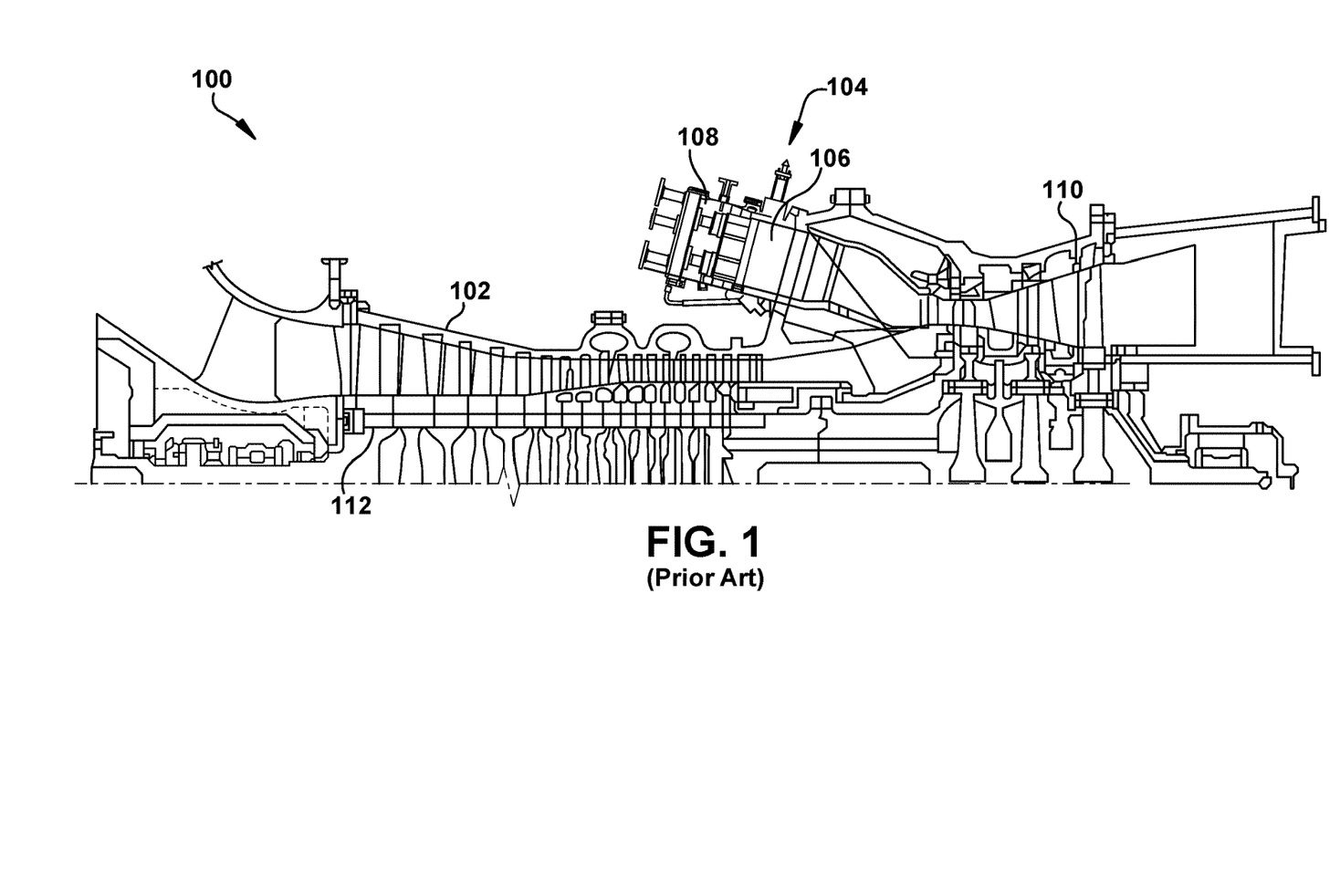
FIG. 1 shows a schematic view of an illustrative turbomachine in the form of a gas turbine system.

FIG. 1 shows a schematic illustration of an illustrative turbomachine, part of which may be repaired according to teachings of the disclosure. In the example, the machine includes a turbomachine in the form of a combustion or gas turbine (GT) system 100. GT system 100 includes a compressor 102 and a combustor 104. Combustor 104 includes a combustion region 106 and a fuel nozzle assembly 108. GT system 100 also includes a turbine 110 and a common compressor/turbine shaft 112 (sometimes referred to as a rotor 112). In one embodiment, the combustion turbine system is a MS7001FB engine, sometimes referred to as a 7FB engine, commercially available from General Electric Company, Greenville, S.C. The present disclosure is not limited to any one particular industrial machine, nor is it limited to any particular combustion turbine system and may be implanted in connection with other engines including, for example, the MS7001FA (7FA), the MS9001FA (9FA), the 7HA and the 9HA engine models of General Electric Company. Furthermore, the present disclosure is not limited to any particular turbomachine, and may be applicable to, for example, steam turbines, jet engines, compressors, turbofans, etc.

In operation, air flows through compressor 102 and compressed air is supplied to combustor 104. Specifically, the compressed air is supplied to fuel nozzle assembly 108 that is integral to combustor 104. Assembly 108 is in flow communication with combustion region 106. Fuel nozzle assembly 108 is also in flow communication with a fuel source (not shown in FIG. 2) and channels fuel and air to combustion region 106. Combustor 104 ignites and combusts fuel. Combustor 104 is in flow communication with turbine assembly 110 for which gas stream thermal energy is converted to mechanical rotational energy. Turbine assembly 110 includes a turbine 111 that rotatably couples to and drives rotor 112. Compressor 102 also is rotatably coupled to rotor 112. In the illustrative embodiment, there is a plurality of combustors 106 and fuel nozzle assemblies 108.

Figure 2:
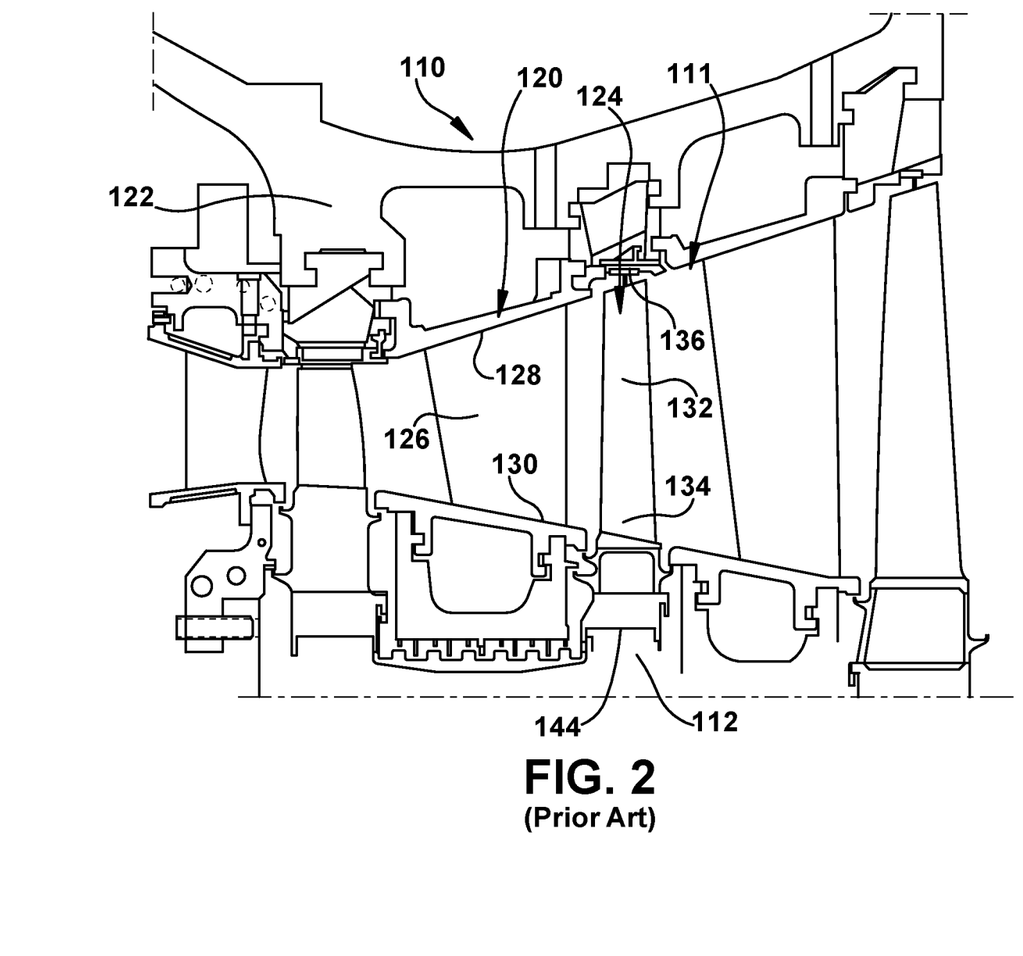
FIG. 2 shows a cross-sectional view of an illustrative gas turbine assembly that may be used with the gas turbine system in FIG. 1.

FIG. 2 shows a cross-sectional view of an illustrative turbine assembly 110 that may be used with GT system 100 in FIG. 1. Turbine 111 of turbine assembly 110 includes a row of nozzle or vanes 120 coupled to a stationary casing 122 of GT system 100 and axially adjacent a row of rotating turbomachine blades 124. A nozzle or vane 126 may be held in turbine assembly 110 by a radially outer platform 128 and a radially inner platform 130. Row of turbomachine blades 124 in turbine assembly 110 includes rotating turbomachine blades 132 coupled to rotor 112 and rotating with the rotor. Turbomachine blades 132 may include a radially inward platform 134 (at root of blade) coupled to rotor 112 and a radially outward tip shroud 136 (at tip of blade). The description will describe embodiments thereof relative to a turbomachine blade 124, i.e., turbomachine blade 132. As will be understood, teachings of the disclosure may also be applicable to nozzles 126 with some minor modifications to the replacement ceramic airfoil radially inner end.

Figure 3:
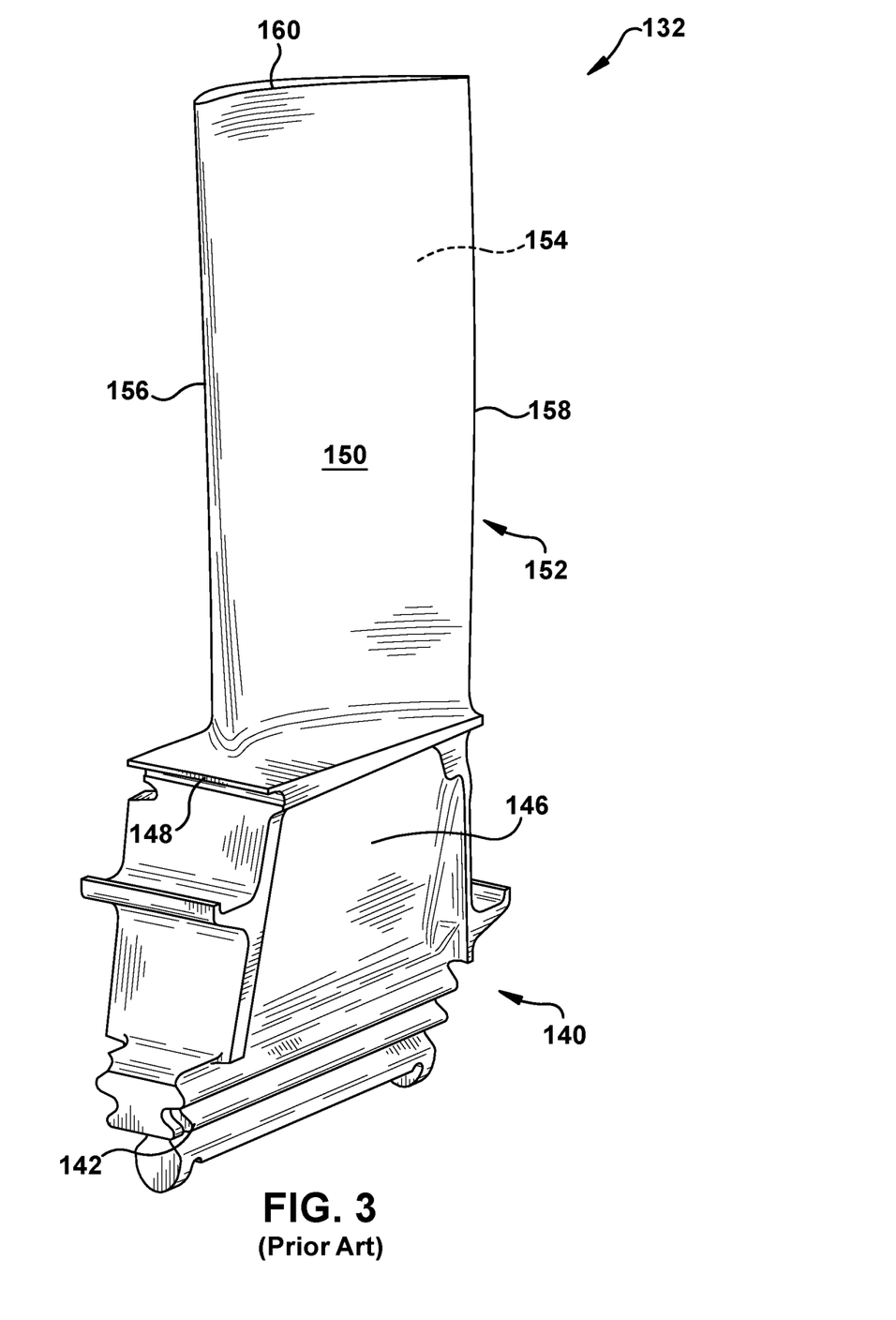
FIG. 3 shows a perspective view of an illustrative turbomachine blade of the type in which embodiments of the present disclosure may be employed.

FIG. 3 shows a perspective view of a turbomachine blade 132 of the type in which embodiments of the present disclosure may be employed. Turbomachine blade 132 is in a used state, meaning it has been used in GT system 100 for a length of time. Turbomachine blade 132 includes a root 140 by which rotor blade 132 attaches to rotor 112 (FIG. 2). Root 140 may include, for example, a dovetail 142 configured for mounting in a corresponding dovetail slot in the perimeter of a rotor wheel 144 (FIG. 2) of rotor 112 (FIG. 2). Root 140 may further include a shank 146 that extends from dovetail 142 to a platform 148. Platform 148 couples to shank 146 and is disposed at the junction of airfoil 150 and root 140. Platform 148 defines a portion of the inboard boundary of the flow path through turbine assembly 110 (FIG. 2). It will be appreciated that airfoil 150 is the active component of turbomachine blade 132 that intercepts the flow of working fluid and induces the rotor disc to rotate. It will be seen that airfoil 150 of turbomachine blade 132 includes a concave pressure side (PS) outer wall 152 and a circumferentially or laterally opposite convex suction side (SS) outer wall 154 extending axially between opposite leading and trailing edges 156, 158 respectively. Sidewalls 156 and 158 also extend in the radial direction from platform 148 to an outboard tip 160. Turbomachine blade 132 is made of a metal, metal alloy or superalloy capable of withstanding the high temperature environment of GT system 100. After use, airfoil 150 may be worn and in need of replacement, while shank 146 has additional life remaining.

FIGS. 4-9 show a method according to embodiments of the disclosure. In the perspective view of FIG. 4, in a used metal turbomachine blade, airfoil 150 is removed, leaving a remaining base 200 including platform 148 and root 140 with shank 146. Airfoil 150 may be removed in any now known or later developed fashion, e.g., by cutting using electric discharge machining (EDM), cutting blades, laser, etc. Platform 148 may undergo any additional machining desired to remove any remnants of airfoil 150, e.g., grinding, sanding, etc. As noted, remaining portion 200, including shank 146 and platform 148, can include any now known or later developed metal, metal alloy or superalloy typically used in GT system 100 (FIG. 1), e.g., a high temperature alloy or superalloy.

Figure 4:
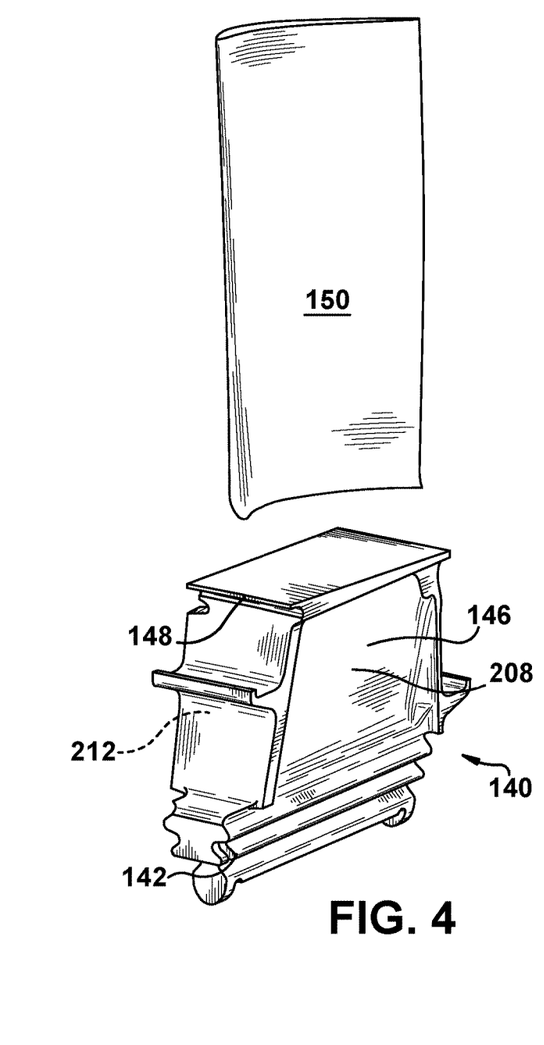
FIG. 4 shows a perspective view of a remaining base of the turbomachine blade of FIG. 3 after removal of the airfoil, according to embodiments of the disclosure.
Figure 5:
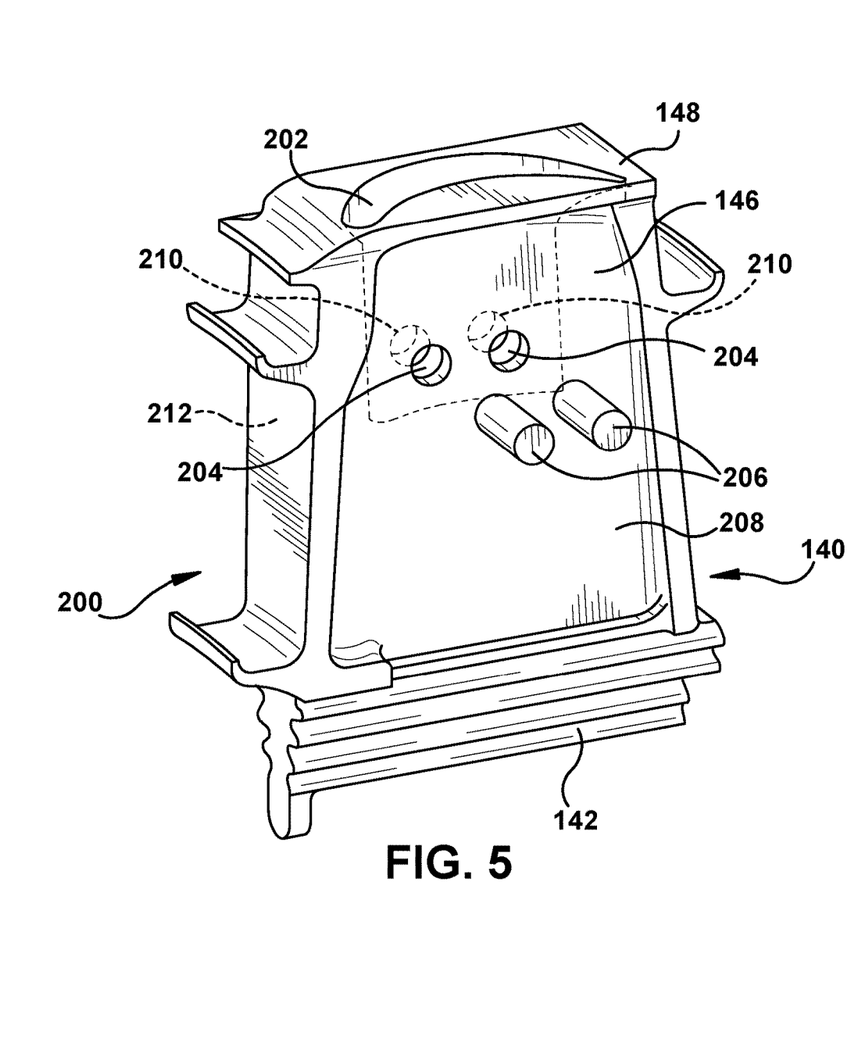
FIG. 5 shows a perspective view of forming a radially extending opening in the shank of the remaining base, according to embodiments of the disclosure.

FIG. 5 shows forming a radially extending opening 202 through platform 148 into shank 146, i.e., of remaining base 200. Radially extending opening 202 may be formed using any now known or later developed method such as but not limited to: EDM, laser cutting and/or machining. In addition, at least one connector opening 204 may be formed through shank 146. As will be described, each connector opening 204 is configured to receive a connector 206 therein. As shown in FIG. 4, each connector opening 204 in shank 146 may include a first connector opening(s) 204 in a first face 208 of shank 146 and/or a corresponding, second connector opening(s) 210 in a second, opposing face 212 of shank 146. That is, first connector opening(s) 204 can be provided alone, second connector opening(s) 210 can be formed alone, or they can both be formed. Each connector opening 204, 210 may be formed using any now known or later developed manner corresponding to the type of connector 206 expected to be used. For example, drilling, drilling with thread tapping, etc.

Figure 6:
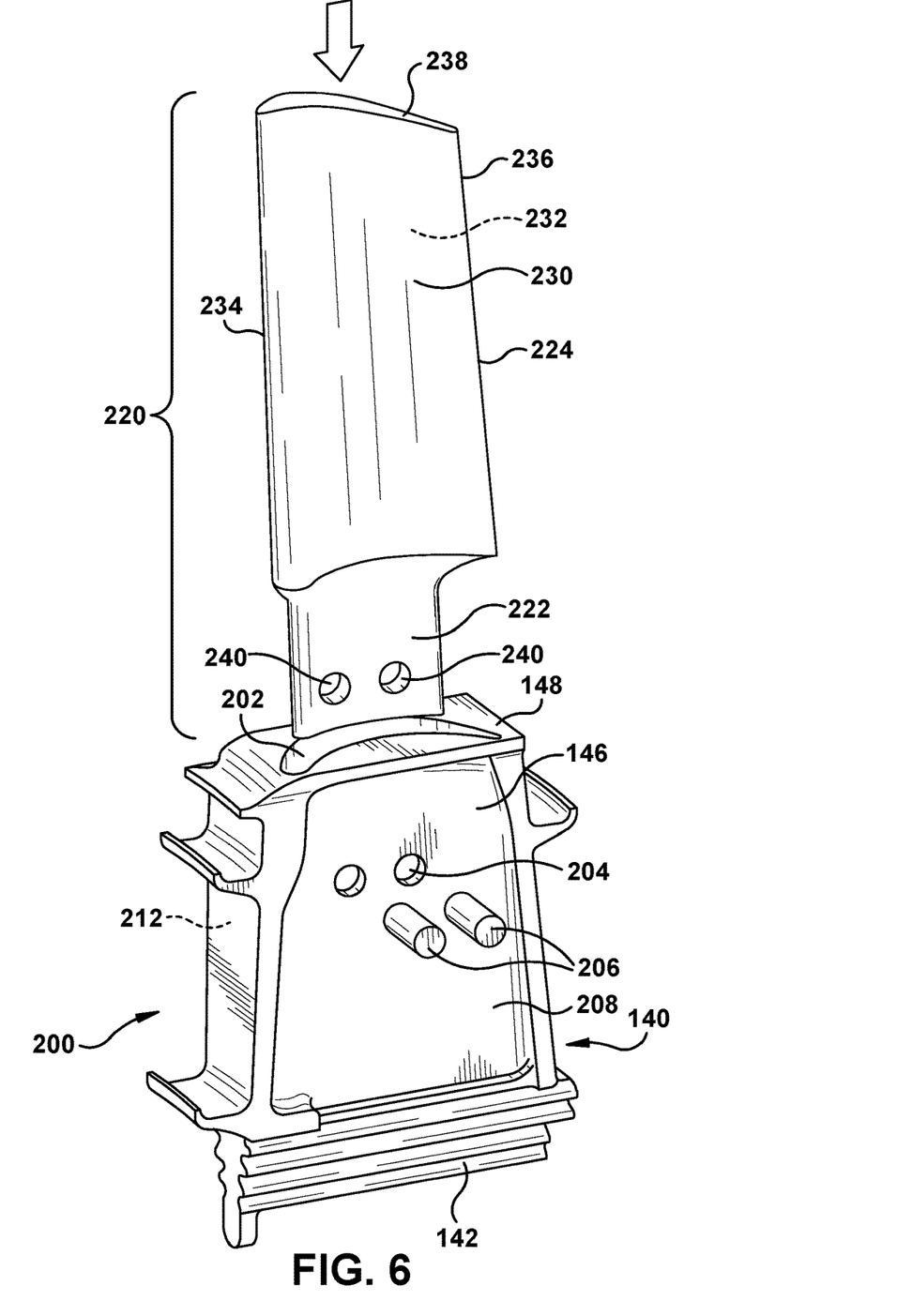
FIG. 6 shows a perspective view of inserting a ceramic airfoil into the radially extending opening, according to embodiments of the disclosure.

FIG. 6 shows a ceramic airfoil 220 including a ceramic shank nub 222 and a ceramic airfoil body 224. Ceramic airfoil 220 may be formed using any now known or later developed ceramic matrix composite material appropriate for the harsh environment of GT system 100, and may be made using any now known or later developed process. In one example, ceramic airfoil 220 may be made by layering ceramic plies and infiltrating the plies with a ceramic slurry, followed by any desired finishing steps, e.g., machining, coating, etc. Airfoil body 224 may have a shape substantially similar to that of airfoil 150 (FIG. 3) that was removed, or it may have a shape that is different to provide different operational characteristics for the replacement ceramic airfoil 220. In any event, airfoil body 224 includes a concave pressure side (PS) outer wall 230 and a circumferentially or laterally opposite convex suction side (SS) outer wall 232 extending axially between opposite leading and trailing edges 234, 236, respectively. As will be subsequently apparent, when in place, sidewalls 230 and 232 will extend in the radial direction from platform 148 to an outboard tip 238. Ceramic airfoil 220 may include any now known or later developed cooling systems therein, e.g., cooling passages, surface openings, etc., and may accommodate any now known or later developed exterior structures such as but not limited to a shroud (not shown).

FIG. 6 also shows inserting ceramic shank nub 222 extending from ceramic airfoil body 224 into radially extending opening 202 of remaining base 200. As shown in FIGS. 5 and 6, radially extending opening 202 has a cross-sectional shape configured to receive ceramic shank nub 222 of ceramic airfoil 220, and ceramic shank nub 222 may have a shape configured to fit into radially extending opening 202. Ceramic shank nub 222 and radially extending opening 202 may provide a tight, but not interference level, fit. Ceramic shank nub 222 may also include connector opening(s) 240 therein configured to receive a connector 206. Connector opening(s) 240 may be configured to, when ceramic shank nub 222 is in position in shank 146, correspond in location, shape and size with connector opening(s) 204, 210 in shank 146. Ceramic shank nub 222 may have any length, size and/or shape necessary to secure ceramic airfoil 220 to remaining base 200. In the example shown, radially extending opening 202 and ceramic shank nub 222 have corresponding airfoil cross-sections. Other shapes are also possible such as but not limited to: polygonal, oval, etc.

Figure 7:
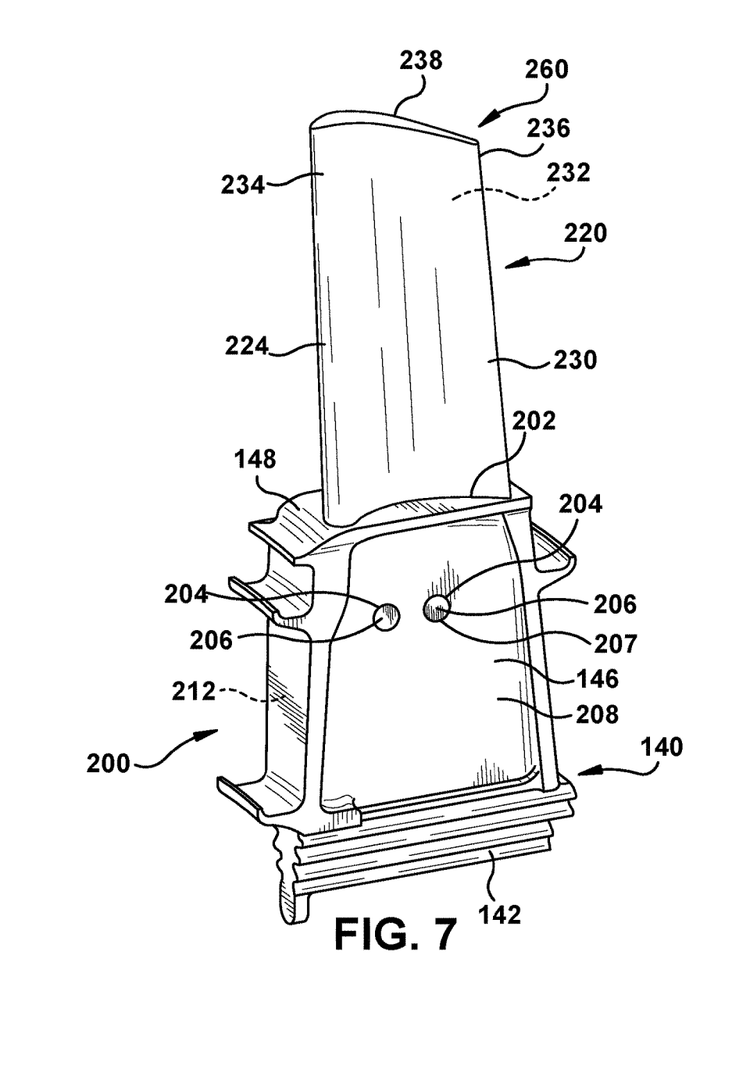
FIG. 7 shows a first perspective view of a fixing the ceramic airfoil to the remaining base of the turbomachine blade and a turbomachine blade, according to embodiments of the disclosure.
Figure 8:
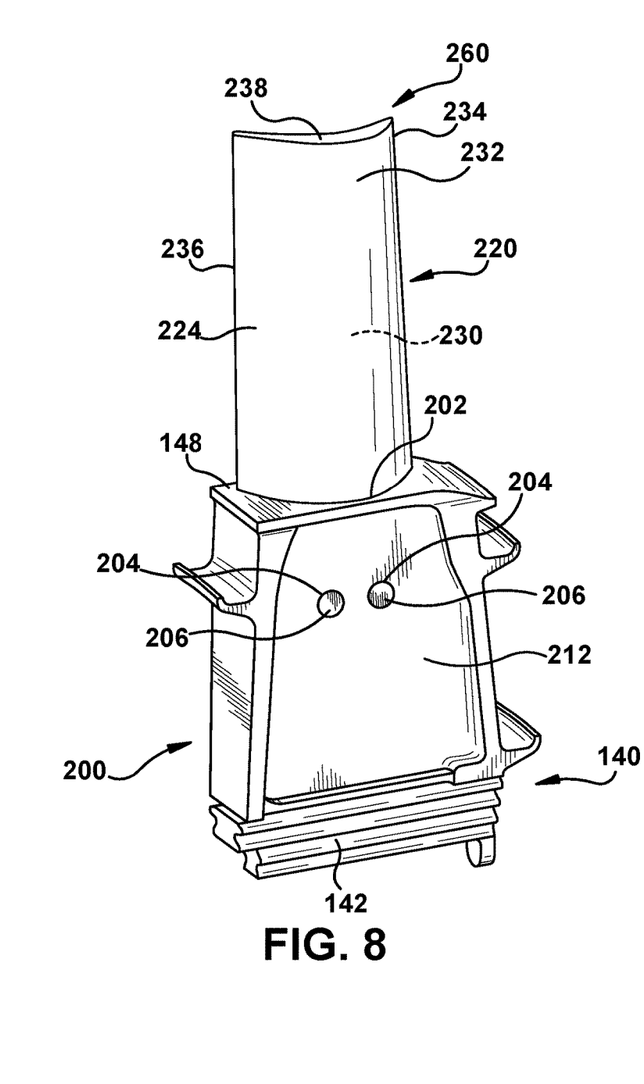
FIG. 8 shows a second perspective view of a fixing the ceramic airfoil to the remaining base of the turbomachine blade and a turbomachine blade, according to embodiments of the disclosure.
Figure 9:
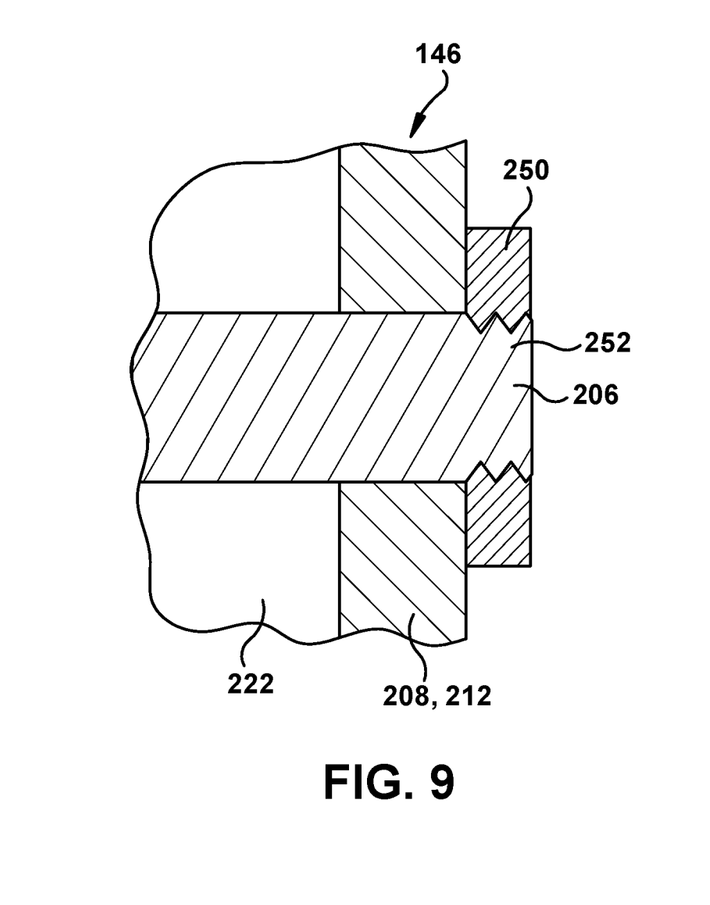
FIG. 9 shows a partial cross-sectional view of an alternative embodiment of a fastener for a connector.
Figure 10:
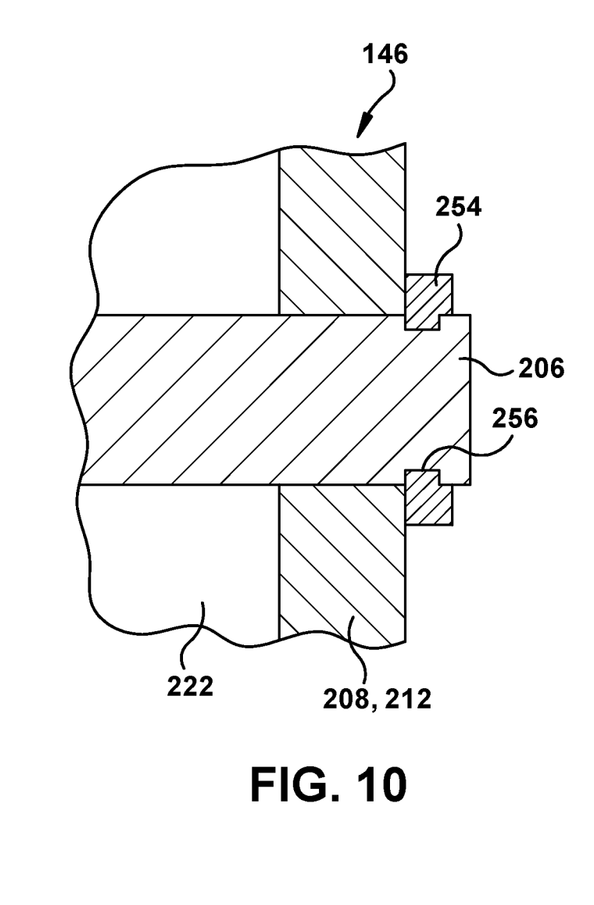
FIG. 10 shows a partial cross-sectional view of another alternative embodiment of a fastener for a connector.

FIGS. 7 and 8 show perspective views of fixedly attaching ceramic airfoil 220 to remaining base 200, i.e., once ceramic shank nub 222 (FIG. 6) is inserted into radially extending opening 202 (FIG. 6). In one embodiment, fixedly attaching ceramic airfoil 220 to remaining base 200 includes inserting a connector 206 through each connector opening 204, 210 in shank 146 and each connector opening 240 (FIG. 6) in ceramic shank nub 222 (FIG. 6). In one embodiment, as shown in FIG. 7, connector(s) 206 may extend through connector opening(s) 204 in face 208 of shank 146 and through connector opening 240 in ceramic shank nub 222 in ceramic airfoil 220. Alternatively, as shown best in FIG. 5, connector opening(s) in shank 146 may include a first connector opening 204 in first face 208 of shank 146 and/or a corresponding, second connector opening 210 in second, opposing face 212 of shank 146. In this embodiment, as shown by comparing FIGS. 7 and 8, connector(s) 206 may extend through connector opening(s) 204 in face 208 of shank 146, through connector opening 240 in ceramic shank nub 222 in ceramic airfoil 220, and into or through connector opening(s) 210 in opposing face 212 of shank 146. Different types of connector(s) 206 may be employed. In one embodiment, connector(s) 206 may include simple pegs configured for an interference fit in connector openings 204, 240 and/or 210. Here, fixating each connector 206 may include deforming a portion of each connector 206, e.g., either a portion along a length thereof or a head or end 207 (FIG. 7) thereof. Alternatively, as shown in FIGS. 9 and 10, connector(s) 206 may include a fixating fastener. FIG. 9 shows a nut 250 on a connector 206 including at least a threaded end 252, and FIG. 10 shows a clip ring 254 engaged on an end of connector 206 including a ring seat 256 therein. While particular examples of fixating connector 206 have been illustrated, it is understood that any now known or later developed manner of fixating connectors may be employed, and are considered within the scope of the disclosure.

Returning to FIGS. 7 and 8, a turbomachine blade 260 according to embodiments of the disclosure may include root 140 having shank 146, and platform 148 coupled to shank 146. The aforementioned structure is provided as part of remaining base 200, i.e., after metal airfoil 150 (FIG. 4) has been removed therefrom. Turbomachine blade 260 also include radially extending opening 202 (FIG. 7) extending through platform 148 into shank 146. As shown best in FIG. 6, ceramic airfoil 220 includes ceramic airfoil body 224 and ceramic shank nub 222. Ceramic shank nub 222 extends from ceramic airfoil body 224 into radially extending opening 202 of shank 146. Turbomachine blade 202 also includes connector(s) 206 extending through connector opening(s) 204 and/or 210 in at least one face 208, 212, respectively, of shank 146 to fixedly attach ceramic airfoil 224 to shank 146. In one embodiment, connector 206 may include a plurality of connectors 206 extending through at least one sidewall 208, 212 of shank 146 to fixedly attach the ceramic airfoil to the shank. Ceramic shank nub 222 may include connector opening(s) 240 therein, each configured to receive a connector 206. In one embodiment, connector opening(s) in shank 146 may be provided in only one face 208 or 212 thereof, see e.g., FIG. 7 or FIG. 8. Alternatively, as shown in both FIGS. 7 and 8, connector opening(s) in shank 146 may include connector opening(s) 204 in first face 208 of shank 146, and a corresponding, second connector opening(s) 210 in a second, opposing face 212 of shank 146. Each connector 206 may include a deformed portion (e.g., a head or end 207 thereof (FIG. 7)) fixedly attaching the connector to a connector opening, e.g., 204, 240 and/or 210. Alternatively, a fastener such as a nut or ring clip (FIGS. 9 and 10) may fixedly attach connector(s) 206 to connector opening(s) 204, 240 and 210.

Connectors 206 may include any now known or later developed material appropriate for the harsh environments of GT system 100 such a high temperature metal alloy, e.g., A286 or a nickel alloy like Rene 108 or Rene N5.

Embodiments of the disclosure provide repair of a used turbomachine blade by removing the metal airfoil, creating an opening to receive a new ceramic airfoil, and attach a new ceramic airfoil to the metal shank. The repaired turbomachine blade can then be put back into service. The new ceramic airfoil will use less cooling than the previous metal airfoil which will improve turbine performance. Minimizing the ceramic material used minimizes the cost of the upgrade as these ceramic materials currently cost more than metal alloys and/or superalloys. Further, embodiments of the disclosure allow capture of a shank's remaining life beyond that of the original metal blade.

It should be noted that in some alternative implementations, the acts noted in the drawings may occur out of the order noted or, for example, may in fact be executed substantially concurrently or in the reverse order, depending upon the act involved. Also, one of ordinary skill in the art will recognize that additional steps may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, comprising:
   in a used metal turbomachine blade including a root having a shank, a platform coupled to the shank and an airfoil coupled to the platform:
   removing the airfoil, leaving a remaining base including an entirety of the platform and the root with an entirety of the shank;
   forming a radially extending opening in a surface of the platform, through the platform, and into the shank;
   inserting a ceramic shank nub extending from a ceramic airfoil into the radially extending opening of the remaining base; and
   fixedly attaching the ceramic airfoil to the remaining base to form a repaired turbomachine blade.

2. The method of claim 1, further comprising forming at least one connector opening through the shank, the connector opening configured to receive a connector therein.

3. The method of claim 2, wherein the ceramic shank nub includes at least one connector opening therein configured to receive the connector, and wherein fixedly attaching the ceramic airfoil to the remaining base includes inserting a connector through each connector opening in the shank and each connector opening in the ceramic shank nub.

4. The method of claim 3, wherein the at least one connector opening in the shank includes a first connector opening in a first face of the shank and a corresponding, second connector opening in a second, opposing face of the shank.

5. The method of claim 2, further comprising fixating each connector in place relative to the shank.

6. The method of claim 5, wherein fixating each connector includes deforming a portion of each connector.

7. The method of claim 5, wherein fixating each connector includes attaching a fixating fastener to each connector.

8. The method of claim 1, further comprising, after removing the airfoil, removing any remnants of the airfoil remaining on the platform, leaving the remaining base including the entirety of the platform and the root with the entirety of the shank.

9. The method of claim 1, wherein after removing the airfoil, the platform remains intact and an upper surface of the platform remains holeless, and wherein the radially extending opening is formed in the holeless upper surface of the platform, through the platform, and into the shank.

10. The method according to claim 1, wherein the radially extending opening is formed by electrical discharge machining, laser cutting, and/or machining.

* * * * *